(12) United States Patent
Schoenberger (10) Patent No.: US 10,434,699 B2
(45) Date of Patent: Oct. 8, 2019

(54) APPARATUS AND A METHOD FOR HEATING PLASTIC PREFORMS WITH DECOUPLED TRANSPORT DEVICES

(71) Applicant: KRONES AG, Neutraubling (DE)

(72) Inventor: Wolfgang Schoenberger, Brennberg (DE)

(73) Assignee: KRONES AG (DE)

( * ) Notice: Subject to any disclaimer, the term of this patent is extended or adjusted under 35 U.S.C. 154(b) by 177 days.

(21) Appl. No.: 15/159,118

(22) Filed: May 19, 2016

(65) Prior Publication Data

US 2016/0339622 A1    Nov. 24, 2016

(30) Foreign Application Priority Data

May 19, 2015  (DE) .......................... 10 2015 107 814

(51) Int. Cl.
*B29C 49/42*    (2006.01)
*B29C 49/64*    (2006.01)
(Continued)

(52) U.S. Cl.
CPC ...... *B29C 49/4205* (2013.01); *B29C 49/4236* (2013.01); *B29C 49/6418* (2013.01);
(Continued)

(58) Field of Classification Search
CPC ............ B29C 49/4205; B29C 49/4236; B29C 49/6418; B65G 47/846; B65G 47/10; B65G 43/10
See application file for complete search history.

(56) References Cited

U.S. PATENT DOCUMENTS 6,264,457 B1    7/2001  Ohmes et al. ................. 425/145
6,386,857 B1    5/2002  Nava .............................. 425/526
(Continued)

FOREIGN PATENT DOCUMENTS

CN    102009468    4/2011    ............. B29C 49/64
CN    102470992    5/2012    ............. B65G 47/84
(Continued)

OTHER PUBLICATIONS

German Office Action issued in application No. 10 2015 107 814.7, dated Feb. 8 2016 (8 pgs).

(Continued)

*Primary Examiner* — Robert B Davis
(74) *Attorney, Agent, or Firm* — Hayes Soloway P.C.

(57) ABSTRACT

An apparatus for heating plastic preforms includes a first transport device that transports the plastic preforms in a separated manner, wherein said first transport device has a plurality of recesses for receiving the plastic preforms, and a second transport device that takes over the plastic preforms transported by the first transport device and transports said plastic preforms along a predetermined transport path. The second transport device has a plurality of holding elements for holding the plastic preforms. The apparatus also includes at least one heating device that heats the plastic preforms transported by the second transport device, wherein at least the first transport device is a circulating transport device, wherein a relative position of the recesses of the first transport device in the circulation direction of the first transport device relative to a position of the holding elements in respect of the transport path can be changed.

17 Claims, 4 Drawing Sheets

(51) Int. Cl.
  *B29L 31/00*    (2006.01)
  *B29C 49/06*    (2006.01)
  *B29C 49/36*    (2006.01)
  *B29C 49/10*    (2006.01)
  *B29K 67/00*    (2006.01)

(52) U.S. Cl.
  CPC .............. *B29C 49/06* (2013.01); *B29C 49/10* (2013.01); *B29C 49/36* (2013.01); *B29C 49/64* (2013.01); *B29K 2067/003* (2013.01); *B29L 2031/7158* (2013.01)

(56) References Cited

U.S. PATENT DOCUMENTS

| | | | |
|---|---|---|---|
| 8,501,078 B2 | 8/2013 | Meinzinger | 264/521 |
| 8,668,074 B2 | 3/2014 | Davidson | 198/478.1 |
| 9,096,393 B2 | 8/2015 | Stein et al. | B65G 47/34 |
| 9,463,591 B2 | 10/2016 | Winzinger | B29C 49/4205 |
| 2008/0044510 A1 | 2/2008 | Doudement | 425/537 |
| 2013/0220769 A1* | 8/2013 | Stein | B65G 47/34 198/370.01 |
| 2013/0313081 A1* | 11/2013 | Krulitsch | B65G 47/847 198/803.3 |
| 2015/0048074 A1 | 2/2015 | Schoenberger | 219/388 |
| 2015/0111162 A1 | 4/2015 | Huettner et al. | F27D 3/06 |
| 2016/0339622 A1 | 11/2016 | Schoenberger | B29C 49/4236 |

FOREIGN PATENT DOCUMENTS

| | | | |
|---|---|---|---|
| CN | 102730415 | 10/2012 | B65G 47/92 |
| CN | 103286884 | 9/2013 | B29L 22/00 |
| CN | 104369353 | 2/2015 | B29C 49/64 |
| DE | 10214787 | 10/2003 | B29C 49/42 |
| DE | 102010028383 | 11/2011 | B65G 43/08 |
| DE | 102013108763 | 3/2015 | B29C 49/42 |
| EP | 1112835 | 7/2001 | B29C 49/42 |
| EP | 2292407 | 3/2011 | B29C 49/42 |
| EP | 2511205 | 10/2012 | B29C 49/42 |
| EP | 2561972 | 2/2013 | B29C 49/64 |
| EP | 2633978 | 9/2013 | B29C 49/42 |
| EP | 2671825 | 12/2013 | B29C 49/42 |
| EP | 2746030 | 6/2014 | B29C 49/28 |
| EP | 2837487 | 2/2015 | B29C 49/42 |
| WO | WO0166328 | 9/2001 | B29C 31/08 |

OTHER PUBLICATIONS

Chinese First Office Action (w/translation) issued in application No. 201610333359.X, dated Oct. 31, 2017 (10 pgs).
Chinese First Office Action (w/translation) issued in application No. 201610333619.X, dated Oct. 31, 2017 (11 pgs).
EPO search report issued in application No. 16170430.9, dated Sep. 21, 2016 (5 pgs).
EPO Search Report issued in application No. 16170318.6, dated Oct. 20, 2016 (8 pgs).
German Office Action issued in application No. 10 2015 107 855.4, dated Feb. 5, 2016 (8 pgs).
Office Action issued in U.S. Appl. No. 15/159,125, dated Mar. 15, 2018 (13 pgs).
Notice of Opposition filed in corresponding European Patent No. EP3095582, dated Sep. 12, 2018 (40 pgs), including transmittal, receipt and Facts and Arguments.

\* cited by examiner

APPARATUS AND A METHOD FOR HEATING PLASTIC PREFORMS WITH DECOUPLED TRANSPORT DEVICES

BACKGROUND OF THE INVENTION

The present invention relates to an apparatus and a method for heating plastic preforms. Such apparatus and methods have been known from the prior art for a long time. In these apparatus, plastic preforms produced are usually heated in an oven and are subsequently supplied in this heated condition to a stretch blow machine that expands these plastic preforms into plastic containers such as in particular plastic bottles.

In the course of this, the plastic preforms are fed in these heating devices to a heating section via a distribution star wheel such as for example a sawtooth star wheel. In the course of this, the sawtooth star wheel separates the plastic preforms to set a predetermined pitch between them. Subsequently, these plastic preforms are placed on heating mandrels. These heating mandrels are in turn moved through the heating tunnel by means of a transport chain. The location at which the plastic preform is transferred to the heating mandrel by the sawtooth star wheel, which will be referred to below as the transfer point for the oven infeed, must be adjusted very accurately in order to ensure a problem-free passage of the plastic preforms.

In the case of systems known from the prior art, this sawtooth star wheel is driven via a toothed belt, which toothed belt is in turn coupled with the drive of the transport chain for the heating mandrels. The transfer point is established here once at the factory. In the prior art, if the mouth of the plastic preform is changed, then the pocket size and thus also the transfer point will be accurately adapted via a second sawtooth module. A displacement of this point in the case of a format changeover is consequently possible only by changing the individual module, i.e. the sawtooth star wheel, and only by way of a mechanical post-adjustment or adjustment of the transfer point. However, the latter is not to be recommended for the operator, because this means a time-consuming and error-prone activity.

The coupling between these drives further has the disadvantage that in the case of jamming of the plastic preforms even a "slight" distortion of the clamping sets in the drive train will be detected either not at all or only late. As a result, the transfers of the plastic preforms (possibly also as a result of a displacement of the transfer point) deteriorate and the wear and tear of parts on the heating mandrels and transport spindles will increase unnoticed.

Further, if the mouths of the plastic preforms are located very close to each other in the neck diameter, then these will be moved with one and the same sawtooth star wheel. Thus, part costs will be saved, and above all, the unpopular changes and changeover times at the customer's will be avoided.

The gradation of the diameter change of the plastic preform is approximately 1 mm. As a consequence, the transfer point can, in the worst case, may be displaced by 0.5 mm or, as a result, deteriorate.

In these cases, at least one transfer point will not or never be ideally adjusted. Either one transfer point is adjusted ideally and the other one consequently badly, or none of the two transfer points is adjusted badly but not ideally either.

Although this approach is advantageous in so far as the operator does not need to change the modules, however it has the disadvantage that the transfer accuracy at the oven infeed suffers. As a result, placement errors may more frequently occur, which in turn reduces the transfer quality in general and also to the subsequent machine module.

Also, the wear and tear of the preforms increases as a result of a non-central plunging of the holding mandrel into the plastic preform, which can be detected by an increased PET abrasion in the machine.

SUMMARY OF THE INVENTION

The present invention is therefore based on the object of proposing an approach that avoids such inaccuracies during transfer. In other words, a possibility is supposed to be provided to select ideally always the best-possible transfer point for the plastic preforms. A further object of the invention consists in preventing damage to the machine in the case of inaccuracies occurring.

An apparatus according to the invention for heating plastic preforms has a first transport device that transports the plastic preforms in a separated manner, wherein this first transport device has a plurality of reception means for receiving the plastic preforms. Further, the apparatus comprises a second transport device that takes over the transported plastic preforms from the first transport device and transports these plastic preforms along a predefined transport path.

Further, the second transport device comprises a plurality of holding elements for holding the plastic preforms, and further, at least one heating device is provided that heats the plastic preforms transported by the second transport device. In the course of this, at least the first transport device is a circulating transport device.

According to the invention, the relative position of the reception means of the first transport device in the circumferential direction of the first transport device can be modified in relation to a position of the holding elements with regard to the transport path.

This approach allows faults to be prevented, in order to ensure in this way in particular correct transfer points. Thus, this approach allows the risk of damage to the machine to be reduced.

Instead of or in addition to the change of the transfer position as described here, it would however also be possible to prevent damage in the case of occurring errors in the transfer position by means of a safety device.

The invention is therefore also directed to a machine of the type described above, which moreover has a further drive device for moving the holding elements in a longitudinal direction of the plastic preforms, wherein the apparatus additionally includes at least one further drive device for driving at least one transport device.

According to the invention, the apparatus has at least one sensor device that detects at least one measured value that is characteristic of at least one of the two drive devices, and a control device that is suitable and designed for controlling the drive device for moving the holding elements as a function of this characteristic measured value. Preferably, this control device is a closed-loop control device that controls the drive device. An input variable of this control device is thus preferably the measured value detected by the sensor device, for example a measured value that is characteristic of a torque of a drive device.

In this approach it is proposed, as will be explained in more detail below, to detect by means of said measured value whether faults are occurring or will occur, and in this case, the movement of the holding elements is for example stopped, so that a transfer of the plastic preforms from the first transport device to the second transport device will not occur. This sensor device may optionally also be present in the case of the embodiment described above.

A movement of the holding elements in the longitudinal direction of the plastic preforms is in particular understood to mean that the latter move exactly along the longitudinal direction. However, a movement in a direction obliquely thereto would also be conceivable.

Thus, in particular the second transport device is disposed downstream of the first transport device in the transport direction of the plastic preforms. Preferably, the second transport device follows directly from the first transport device and/or takes over the plastic preforms immediately from the first transport device. Preferably, the second transport device also transports the plastic preforms in a separated manner. Preferably, a pitch of the reception means of the first transport device corresponds to a pitch of the holding devices of the second transport device.

Thus, it is proposed in the first approach illustrated above that an in particular targeted change to the circulation position of the reception means relative to the circulation position of the holding means can be carried out, in particular in order to ensure that the transfer point, at which the plastic preforms can be taken over by the holding elements proceeding from the reception means, can be adapted or modified. With the second approach, further errors that may develop in particular as a result of an unwanted displacement of the transfer point can be avoided.

As mentioned above, a common drive is provided in the prior art, so that the two transport devices are coupled. No fine correction is provided. It is now proposed within the scope of the invention to design this coupling so that it can be separated at least at times, so that the transfer point can be adjusted.

A circulating transport means is understood to mean that the reception means move here along a closed movement path, in particular a circular movement path and/or a movement path with curved sections.

In a further preferred embodiment, the first transport device has a rotatable carrier and the reception means are preferably recesses that are provided in particular on an outer circumference of this carrier. These recesses are also referred to as "pockets". These reception means are used for receiving sections of the plastic preforms, in particular sections that are located below a carrying ring of the plastic preforms. Preferably, the first transport device also includes a guiding element such as in particular a guiding rail that extends around the rotatable carrier. The plastic preforms are preferably guided between this guiding rail and the reception means.

In a further advantageous embodiment, the heating devices are mounted to be stationary relative to the transport path of the plastic preforms. In particular, these are heating devices that apply infrared radiation onto the plastic preforms. Preferably, the heating devices have heating tubes or radiant heaters that preferably extend, at least in sections, along the transport path of the plastic preforms. However, it would also be possible for the heating device to be a microwave heating device that applies microwaves onto the plastic preforms for the heating thereof. Also, individual microwave stations may be provided that are conveyed on a movable, for example a rotatable, carrier.

The holding elements of the second transport device are preferably mandrels that can be introduced into the mouths of the plastic preforms. These mandrels preferably have the same pitch as the reception means of the first transport device.

In a further advantageous embodiment, the apparatus has a further drive device for moving the holding elements or mandrels in the longitudinal direction of the plastic preforms. This drive device may for example be a guiding or actuating cam that effects, due to the transport movements of the holding elements, also a movement of the holding elements in the longitudinal direction of the plastic preforms.

Further, the apparatus preferably has a rotation device that rotates the holding elements about the longitudinal direction thereof and rotates in particular, at least at times, during the heating. This also allows an even heating of the plastic preforms in the circumferential direction thereof.

As mentioned, the reception means of the first transport device are preferably pockets or recesses that receive the plastic preforms. Advantageously, the second transport device is also designed to circulate (and transports for example the plastic preforms along a transport path that is composed of rectilinear and curved sections). Particularly preferably, the second transport device has a transport chain, on which the holding elements are provided. Preferably therefore, as mentioned above, the first transport device and the second transport device are decoupled from each other with regard to their transport movements and/or can be decoupled at least at times.

In a further preferred embodiment, the first transport device has a first drive device for driving the first transport device, and the second transport device has a second drive device for driving the second transport device. Thus, unlike the prior art, different or separate drive devices are proposed. In particular, these drive devices are not coupled together here. Preferably, at least one of these drive devices and in particular both drive devices are electro-motoric drive devices and in particular servo motors. Servo motors offer the advantage that they allow polling of certain measured values, for example torques, in a relatively uncomplicated manner.

In a further advantageous embodiment, the first drive device and the second drive device can be controlled independently of each other. As a result of this independent controllability, the transfer point or the position of the transfer point can be adjusted and/or changed. In particular, the transfer point can be corrected as a result of this.

For the correction, in particular an offset correction between the two drive devices, several approaches are conceivable. It would thus be conceivable that the operator of the machine him/herself establishes the correction parameters. Thus, the correction parameter for another plastic preform could be input via an input means (such as for example a keypad or a touch screen). The device can then automatically adjust the offset between the two drives to the changed parameter. It would also be conceivable for the operator himself to adjust the offset.

It would further be conceivable for the operator only to select the respective recipe deposited in the machine. Correction parameters are preferably already deposited in the type parameters of the machine or are calculated by the machine using certain parameters. In this context it would be conceivable to deposit in the already deposited preform-bottle recipes (=type parameters) of the machine control also further parameters, such as for example the respective preform neck parameter L1 (i.e. the diameter in the region in which the plastic preform is grasped by the first reception device). In the case of a format changeover, the operator must re-select or load a deposited recipe. It thus continues to be possible to install (for example between the machine control and the servo control of the drive device) a processor device that determines the difference angle from both preform sizes. This difference angle can be forwarded to the servo axis as the correction angle (e.g. as in FIG. 5, 0.154°). Preferably, the machine can adjust itself to the new format in relation to the oven infeed. Thus, a fully automatic change of the transfer points may be carried out.

In this context it is possible for a control matched to the two drive devices to be present.

Moreover, also a sensor device may be provided, in order to carry out an automatic correction of the transfer point. Thus, for example, a sensor device can detect a diameter of the plastic preform and can control or effect a corresponding offset of the two transport devices relative to each other as a function of a changed diameter (or can adapt the transfer point).

By driving the second transport device or the transport chain and driving the first transport device or the sawtooth star wheel using a separate drive for each, for example a servo drive, it is possible to compensate in such cases a displacement of the transfer point. All the operator needs to do is to input the correction parameter for example for a second variable (the mouth diameter) of a second plastic preform—in particular on a control panel of the machine—and the machine can adjust itself to the respectively optimal transfer points. In this way, an actual change of module, which would be substantially more time consuming, can be avoided. However, it would—as mentioned above—also be possible, in particular by using sensor devices, to cause such a changeover to be carried out automatically (i.e. without the involvement of the user).

By means of the proposed approach, a plurality of disadvantages of the prior art can thus be remedied. Thus, it can be prevented that in the case of a displacement of the transfer point, the wear and tear of parts on the heating mandrels and the transport spindles increases unnoticed or that preforms jam, which could consequently lead to a lack of synchronicity between the transport chain and the sawtooth star wheel, which could also cause serious damage to the whole machine. Damage occurs above all if the holding elements were plunged into the preform despite a lack of synchronicity. In order to avoid plunging in the case of a lack of synchronicity, a protection device, such as for example in the form of a controllable lifting cam, must be provided for in the design.

In a further advantageous embodiment, the drive device that is used for moving the holding elements in the longitudinal direction of the plastic preforms, can be deactivated and can in particular be deactivated during the on-going operation. Thus, it is in particular possible that the drive device is deactivated during the continued operation of the apparatus and in particular during the continued operation of the first transport device. The applicant reserves the right to claim this aspect also independently of the above-described invention, i.e. irrespective of whether a decoupling of the two transport devices should be possible.

In a further advantageous embodiment, the apparatus includes a controllable lifting cam that is used for feeding the holding mandrels into the mouths of the plastic preforms. In this case, this lifting cam is the above-mentioned drive device. This lifting can if required be switched off, so that the holding elements are not fed into the plastic preforms. This means at the same time a deactivation of the drive device.

Since the actual problem in the case of preform jamming is the non-detection of a displacement of the transfer point, i.e. the transfer of the plastic preform, the separate servo drive offers the possibility of detecting excessive or high torque increases. Such increases of the torques are usually precursors of jams, so that a corresponding signal can be transmitted to the machine control, so that the cam lifting segment is switched off at an early stage during the transfer of the plastic preform. As a result, no engagement of the holding mandrel or of the holding element in the plastic preform takes place. This may in particular take place in case a subsequent lack of synchronicity is likely to occur.

Preferably, the apparatus therefore has a sensor device that detects in particular characteristic values that are characteristic of any occurring or imminent errors during the operation of the apparatus. This may, as mentioned, for example be a torque measurement device that detects torques of the drive device of the transport device and/or variables that are characteristic of such a torque or that result therefrom, such as electric currents. In other words, the sensor device preferably detects at least one measured value that is characteristic of a torque of the at least one drive device (which drives the at least one transport device). This measured value may for example be a current that is used to drive this drive device.

This measured value is preferably detected continuously over a predetermined period of time. It is possible here for this measured value to be compared with a reference value. In case this measured value exceeds the reference value, then this can be evaluated to be an indication that the torque is also too high. In this case, for example the guiding cam can be switched off, so that no further plastic preforms are transferred.

Preferably, the drive device has a guiding cam for moving the holding elements, which extends preferably at least in sections along the transport path of the plastic preforms. The guiding cam preferably effects here the feeding of the holding elements towards the plastic preforms. This guiding cam can here preferably be controlled, i.e. can be moved for example from a working position, in which it causes the holding elements to be fed towards the plastic preforms, into a resting position, in which the holding elements are not fed.

Preferably, for moving the holding elements, the drive device therefore has an actuating device for moving the guiding cam. This actuating device may for example be an electromotive drive. Apart from that, however, also the use of hydraulic or pneumatic drives would be conceivable.

In such situations, as described above, it would also be possible to carry out a correction of the transfer point. If a servo drive or a servo axis is provided, it is possible to record or evaluate the currently necessary torque. The operating moment necessary in the case of properly loaded plastic preforms is known. If the torque rises beyond a predefined limit (e.g. three times the operating torque), the controllable lifting cam segments are switched off at the oven infeed as a matter of precaution.

In a further advantageous embodiment, the apparatus therefore has a sensor device that detects at least one variable that is characteristic of the transfer of the plastic preforms from the first transport device to the second transport device. Advantageously this is a torque that is required for example in order to feed a holding element of the second transport device towards the plastic preforms. The servo axis or the drive, which is capable of handling a multiple of the drive torque, continues to rotate synchronously. If the torque does not continue to rise, the machine continues to run in the production operation, however without loading the defective plastic preforms. It is then not possible either for these plastic preforms to cause damage or attachment errors at the oven infeed and at subsequent plastic bottle transfers or generally in processing steps.

However, if the torque continues to rise, then this is an indication that there will be a preform jam and consequently a lack of synchronicity. In this case, the servo drive can advantageously also function as an electric coupling and can be switched off or disengaged. In this case, a machine control will preferably issue the signal for a controlled stop of the machine and the operator can remove the one or more defective plastic preforms from the sawtooth.

In both cases, the machine components are protected from the detrimental consequences of plastic preform jams or of poorly fed plastic preforms.

In a further advantageous embodiment, a control device is provided that can adjust or correct an offset between the positions of the first transport device and the position of the second transport device (and in particular between the reception means of the first transport device and the holding elements of the second transport device). Advantageously, the drive devices each have, as mentioned above, servo drives.

However, independently of the drive solution described here, also a mechanical solution would be conceivable. It would thus be conceivable for an offset of the sawtooth star wheel or a modification to the rotational position relative to the drive to be carried out manually. It would thus further be possible for the drive of the first and second transport devices to be coupled to each other, so that in principle a permanent coupling is achieved. However, this coupling could be released by user intervention, for example by allowing a certain change to the rotational position of the first transport device or of a rotatable sawtooth star wheel relative to its carrier, for example a shaft, to be carried out.

In this case, the user could, for example when changing over to slightly different plastic preforms, also modify the relative rotational position of the first transport device or of the sawtooth star wheel relative to the second transport device, in particular to the transport chain. It would thus be possible for the first transport device to have a rotatable shaft and for a sawtooth star wheel to be provided on this shaft. The rotational position of this sawtooth star wheel relative to the shaft can in particular be changed by user intervention.

It would be possible here that as a result of this change to the rotational position, a certain bandwidth of plastic preforms can be processed. For example, the user could obtain information via tables as to the rotational position the sawtooth has to be taken to for an ideal adjustment of the transfer point. In so far, also a semi-automatic adjustment would be possible. Thus, a sensor device could detect for example a misorientation, or an angle to which the sawtooth has to be rotated so as to ensure an ideal transfer point could be communicated to the user. Thus, for example, the first transport device could also include a reading device such as a scale that indicates the exact angular position of the sawtooth star wheel to the user. Apart from that, however, it would also be conceivable to provide a drive for adjusting such an offset.

In a further advantageous embodiment, the apparatus has a supply device in order to supply the plastic preforms to the first transport device. Preferably, the first transport device separates these plastic preforms from each other. As such a supply device, for example a supply rail may be provided, in which the plastic preforms are transported in particular so as directly follow each other.

In a further advantageous embodiment, the apparatus has a control device for controlling the two drive devices. Thus, a higher-level control is preferably provided here, which controls both drive devices and in particular controls them in such a way that a transfer point can be ideally adjusted.

Preferably, the control device is a closed-loop control device that is capable of adjusting the transfer point. As an actuation variable for such a control device, for example the above-mentioned torque, and as a control variable, the offset between the transport devices could be used here.

Advantageously, this control device is suitable and designed to control at least one of the two drive devices also on the basis of a parameter that is characteristic of a geometry of the plastic preforms. In particular, one or both drive devices can here also be controlled as a function of a neck diameter of the plastic preforms. This neck diameter results, as will be explained in more detail below, if necessary in a displacement of the transfer point. The control device can here control or adjust, for example on the basis of a user input for example on the basis of a new recipe, an offset between the two transport devices, so that again an ideal transfer point for the plastic preforms is achieved.

In a further advantageous embodiment, the apparatus has a processor device that determines and/or calculates an offset between both drive devices at least on the basis of a characteristic variable of a plastic preform. This characteristic variable is in particular a neck geometry, i.e. in particular a comparison of the two neck geometries. From this comparison, a correction angle can be determined.

In a further advantageous embodiment, a relative position of the reception means of the first transport device in the circulation direction of the first transport device is or can be modified relative to a position of the holding element with respect to the transport path, in order to modify in this way the take-over position or the transfer point, on which the second transport device takes over the plastic preforms. Advantageously here, a slight modification is possible, particularly preferably a modification of +/−5° in relation to the circulation length (i.e. the circulation travel of a reception means), preferably of +/−3%, preferably of +/−1%, preferably of +/−0.5% and preferably of +/−0.3%.

As mentioned above, the first transport device preferably has a rotatable carrier and the reception means are preferably formed as recesses on an outer circumference of this carrier. This carrier is advantageously exchangeable or can be replaced with another carrier. Thus, for example carriers having different geometries of the reception pockets may be replaced with each other.

The present invention is further directed to a method for heating plastic preforms, and the plastic preforms can be transported by means of a first transport device by means of reception means of the first transport device and can be taken over by a second transport device at a predetermined transfer position and can be transported by this second transport device using holding elements that hold the plastic preforms along a predetermined transport path. Further, the plastic preforms are, at least temporally during this transport along the transport path, heated by at least one heating device.

According to the invention, a relative position of reception means of the first transport device in the circulation direction of the first transport device relative to a position of the holding elements in relation to the transport path (of the holding elements) can be changed. In other words, this relative position is preferably changed in a targeted manner, for example in order to change a change-over operation, in particular as a function of geometric parameters of the plastic preforms. Preferably, the change to the relative position is carried out in order to change a transfer point at which the plastic preforms are transferred from the first transport device to the second transport device. Preferably, the first transport device is driven by a first drive device and the second transport device is driven by a second drive device. Preferably, the relative position between the reception means of the first drive device and the holding means of the second drive device is changed by controlling at least one of the two drive devices. In this way, for example an offset between the drives can be changed. Thus, a control device is preferably provided that changes, controls and/or adjusts an offset between the two drive devices.

As an alternative or in addition to the changeability of the relative position, in the method described here it may also be provided that at least one drive device drives at least one transport device and that the holding elements are moved in a longitudinal direction of the plastic preforms by means of a further drive device. According to the invention, at least one measured value that is characteristic of the drive device is detected here, and the further drive device is controlled as a function of this measured value.

Preferably, the characteristic measured value is a measured value that is characteristic of a torque of at least one drive device for the transport device. Preferably, this measured value is continuously detected and/or is compared with at least one limit value.

Preferably, as a function of this measured value, the further drive device can be activated and/or deactivated, i.e. for example the feeding of the holding elements towards the plastic preforms can be activated and/or deactivated.

Preferably, the plastic preforms are contacted or guided along a predetermined region of their transport path both by the reception means and by the holding elements. This is in particular the region in which the holding elements plunge into the plastic preforms. Thus, the transfer point can also be regarded as a transfer region.

BRIEF DESCRIPTION OF THE DRAWINGS

Further advantages and embodiments result from the attached drawings, wherein.

DETAILED DESCRIPTION OF THE INVENTION

Figure 1:
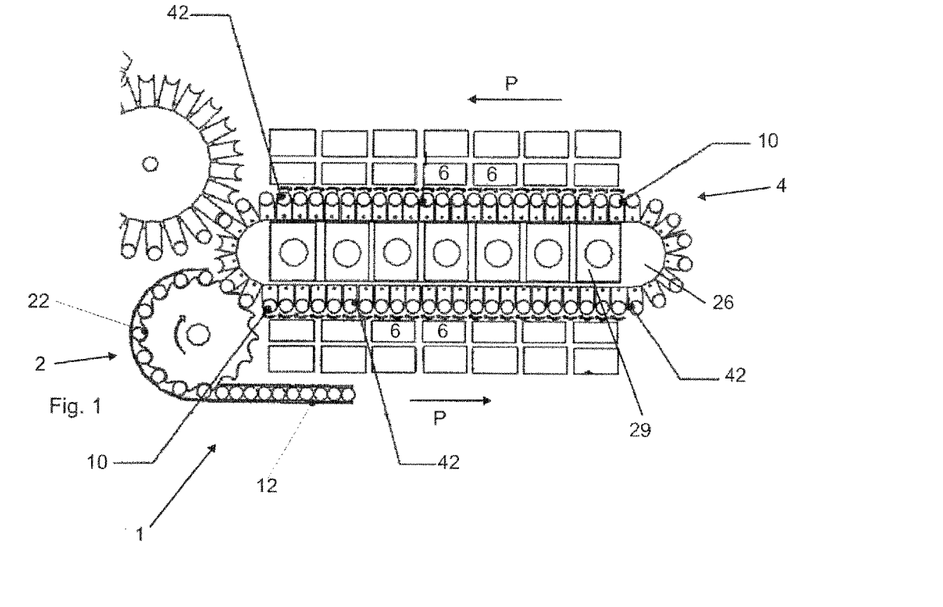
FIG. 1 shows a schematic view of an apparatus for heating plastic preforms.

FIG. 1 shows a schematic view of an apparatus 1 for heating plastic preforms 10. In the course of this, these plastic preforms 10 are fed to a first transport device 2 via a feeding device 12. This first transport device 2 is here a sawtooth star wheel that has a plurality of reception means 22 in the form of recesses. The plastic preforms are carried in these recesses. The first transport device 2 transfers the plastic preforms to a second transport device 4. This second transport device 4 also has a circulating transport means such as a transport chain, on which a plurality of holding elements 42 are arranged.

As can be seen from the figure, these holding elements also allow here a rotation of the plastic preforms about the longitudinal direction or the longitudinal axis thereof.

Reference sign 6 relates to heating devices or heating boxes used for heating the plastic preforms 10. Reference sign 29 identifies cooling devices that apply cooling air onto the plastic preforms at least at times during the heating thereof. In this way, an even heating can be achieved also in the radial direction of the plastic preforms. Reference sign P identifies the transport path of the plastic preforms during the transport thereof using the second transport device 4.

Figure 2:
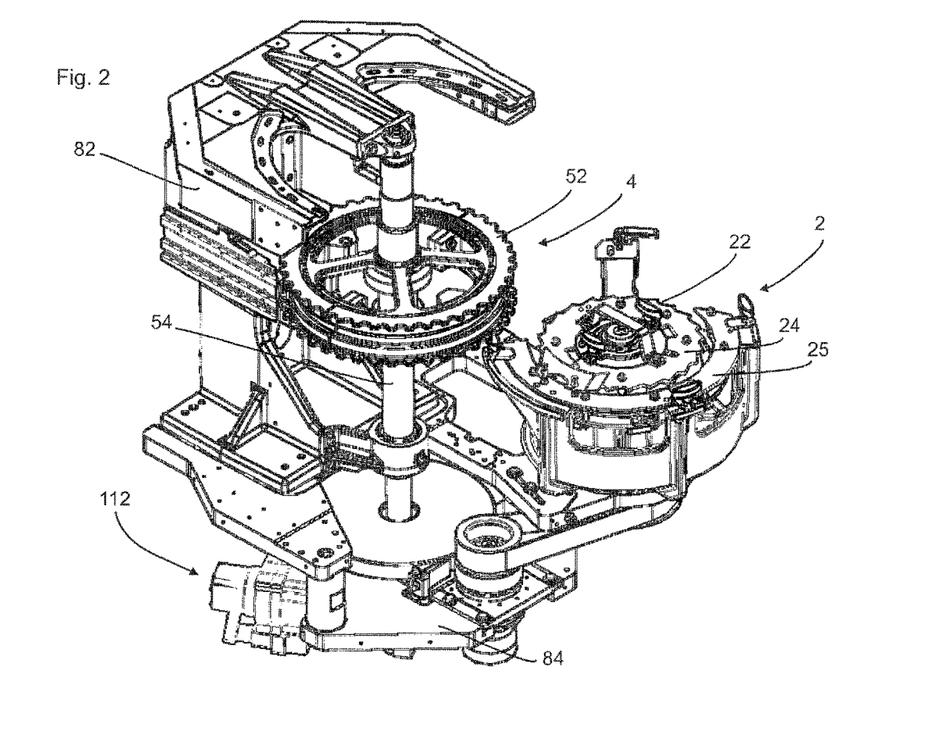
FIG. 2 shows an illustration of an apparatus for heating plastic preforms in detail.

FIG. 2 shows a detailed view of the apparatus 1 for heating plastic preforms. What can be seen again is the first transport device 2 that has the sawtooth star wheel 24 with the reception means 22. Reference sign 25 identifies a guiding rail that guides, together with the recesses 22, the plastic preforms (not shown).

Reference sign 54 identifies a drive shaft that drives or guides a diversion wheel 52 on which a transport chain (not shown) is provided. Reference sign 112 identifies a drive device that drives, via a transmission (not shown), both the sawtooth star wheel 24 and the diversion wheel 52. In the view shown in FIG. 2, the two drives are coupled with each other. Thus, a synchronous drive of the transport star wheel 24 and the diversion wheel 52 is provided here, as known from the prior art. Nevertheless, it would be possible here to achieve an offset by allowing a rotational position of the transport star wheel 24 relative to a drive shaft (not illustrated) to be achieved.

Reference sign 82 relates to a holder for the drive device, and reference sign 84 relates to a bottom table top.

Figure 3:
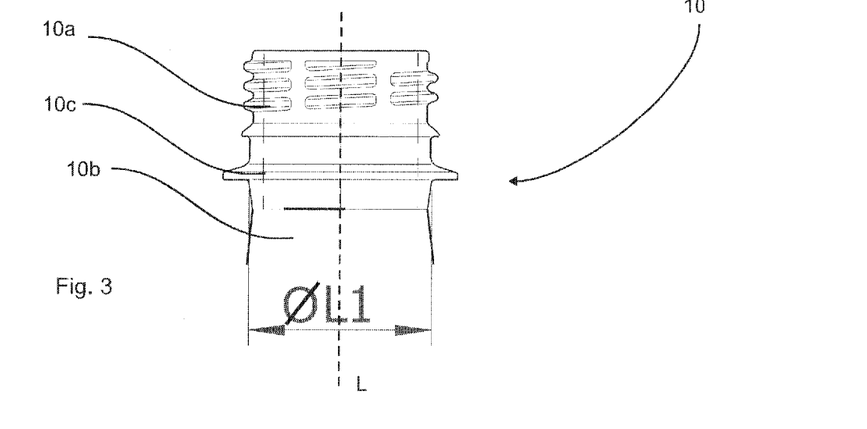
FIG. 3 shows an illustration of a section of the plastic preform to be heated.

FIG. 3 shows a detailed view of the plastic preform 10, more specifically the upper or mouth region thereof. In this context, reference sign 10a relates to a mouth section, reference sign 10c relates to a carrier ring and reference sign 10b relates to a base body of the plastic preform. This base body of the plastic preform has here a certain cross section L1. To this cross section, the reception means 22 of the first transport device 2 is adapted. As explained above, it is possible for the apparatus to trim and optimise itself using type parameters. In this context, a centre offset is preferably automatically calculated and compensated via an angle correction. There is no need for an operator to change, convert or readjust anything mechanical. With any type of plastic preform, an ideal adjustment of the transfer point and thus an enhanced accuracy of the preform transfer is made possible. Reference sign L identifies a longitudinal direction of the plastic preforms.

Figure 4:
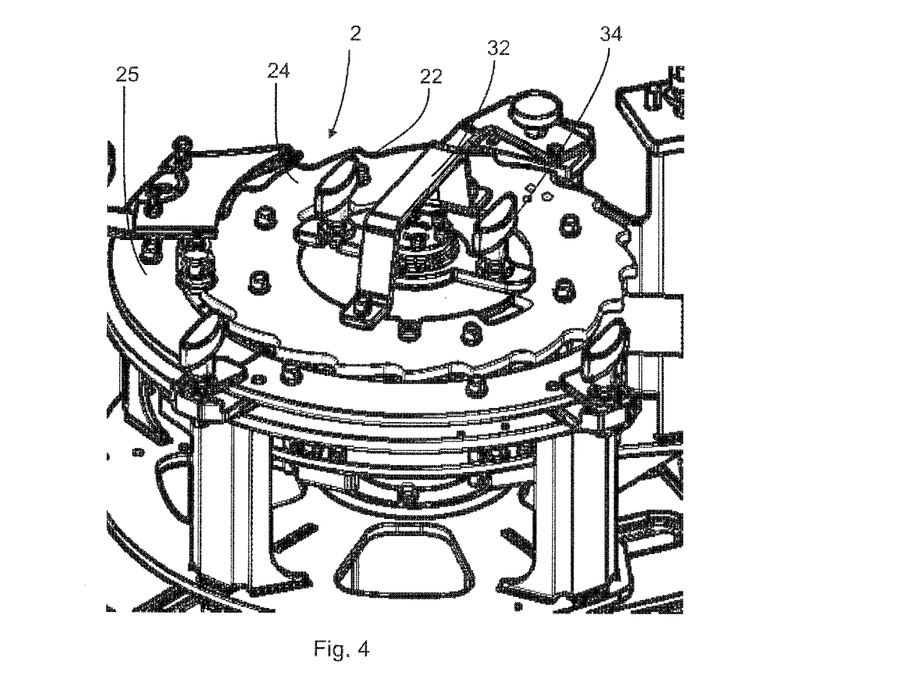
FIG. 4 shows a detailed view of the first transport device.

FIG. 4 shows a schematic view of a first transport device 2 according to the invention. Here again, the transport star wheel 24 with the recesses 22 is shown. What is also shown is the outwardly extending guiding rail 25, the position of which relative to the sawtooth star wheel 24 can be adjusted. Reference sign 32 identifies a gripping element, by means of which the transport star wheel 24 can be removed, for example for mounting purposes. Apart from that, fastening means 34 are provided, which allow the transport star wheel 24 to be released. In addition, it may also be provided here that the fastening means 34 are released so as to subsequently slightly rotate the transport star wheel 24 for adjusting an offset.

Figure 5:
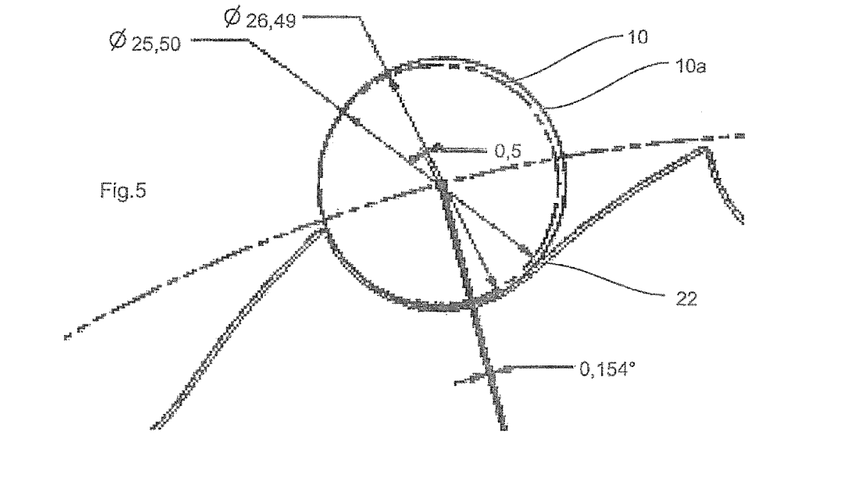
FIG. 5 shows a view for illustrating displacements of the transfer point in the case of different plastic preforms.

FIG. 5 illustrates the displacement of an offset due to different preform geometries. What is assumed here is a tolerance in an amount of 1 mm for the plastic preform. In this context, a plastic preform 10 and a plastic preform 10a are shown, with the plastic preform 10 having a diameter of 25.50 mm and the plastic preform 10a having a diameter of 26.49 mm. Both plastic preforms are to be conveyed using the same reception means 22. It can be seen that the centre point of the plastic preform is displaced by 0.5 mm. This in turn causes the transfer point to be displaced by up to 0.5 mm, so that it may deteriorate. Calculated on the radius of the sawtooth star wheel 24, this leads to an angular displacement from the 0.154° shown here. This angular displacement can now be taken into consideration by the control devices of the apparatus, in order to correspondingly correct the transfer point in this way.

Figure 6:
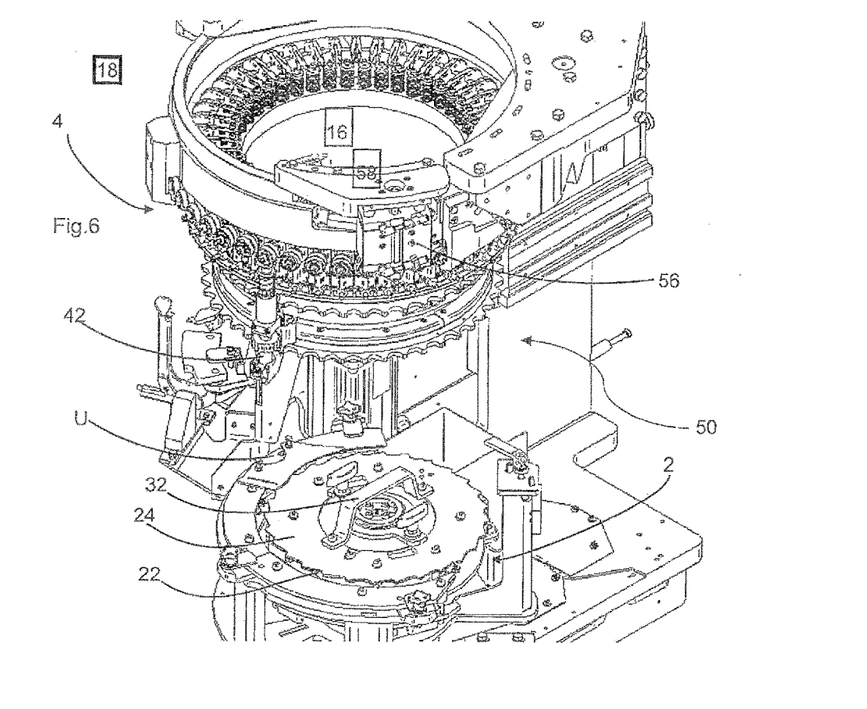
FIG. 6 shows a further view of an apparatus according to the invention for heating plastic preforms.

FIG. 6 shows a view of an apparatus for heating plastic preforms. Again, the first transport device 2 and part of the second transport device 4 are shown. Reference numeral 42 identifies a holding element, such as here a mandrel, which can be introduced into the plastic preforms. Reference sign 56 partially identifies a guiding cam that is used for feeding the holding elements towards the plastic preforms. This guiding cam in particular effects an introduction of the holding mandrels 42 into the plastic preforms. As mentioned above, this guiding cam can preferably be deactivated or removed, in order to avoid damage to the apparatus, for example as a result of jamming of plastic preforms. Reference sign 50 identifies, in its entirety, the drive device that is used for moving the holding elements in the longitudinal direction of the plastic preforms. The guiding cam 56 is a component of this drive device 50.

To this end, for example an actuating device 58 (which also constitutes a component of the drive device) may be provided for moving the guiding cam, such as for example a hydraulic, pneumatic, electromotive or magnetic drive. By means of this actuating device, the guiding cam can be switched off and in this way the feeding of the holding element 42 towards the plastic preforms may be deactivated.

Reference sign 16 schematically identifies a control device that is used for controlling the drive device 50, in particular for controlling the actuating device. Reference sign 18 identifies a sensor device that detects a torque of the first drive device 26 and/or of the second drive device 46 (or a value that is characteristic thereof, such as a current). As a response to this detected torque, the drive device 50, more specifically in particular the actuating device 58, can be caused (in particular by means of the control device 16) to move away the guiding cam and thus to deactivate the feeding of the holding elements towards the plastic preforms.

Reference sign U identifies a transfer point, on which the plastic preforms are transferred from the first transport device to the second transport device. Correspondingly, this point could also be referred to as a take-over point, at which the second transport device 4 takes over the transport preforms 10 from the first transport device 2. By changing the positions of the reception means 22 relative to the holding elements 42, this transfer point can be displaced.

Figure 7:
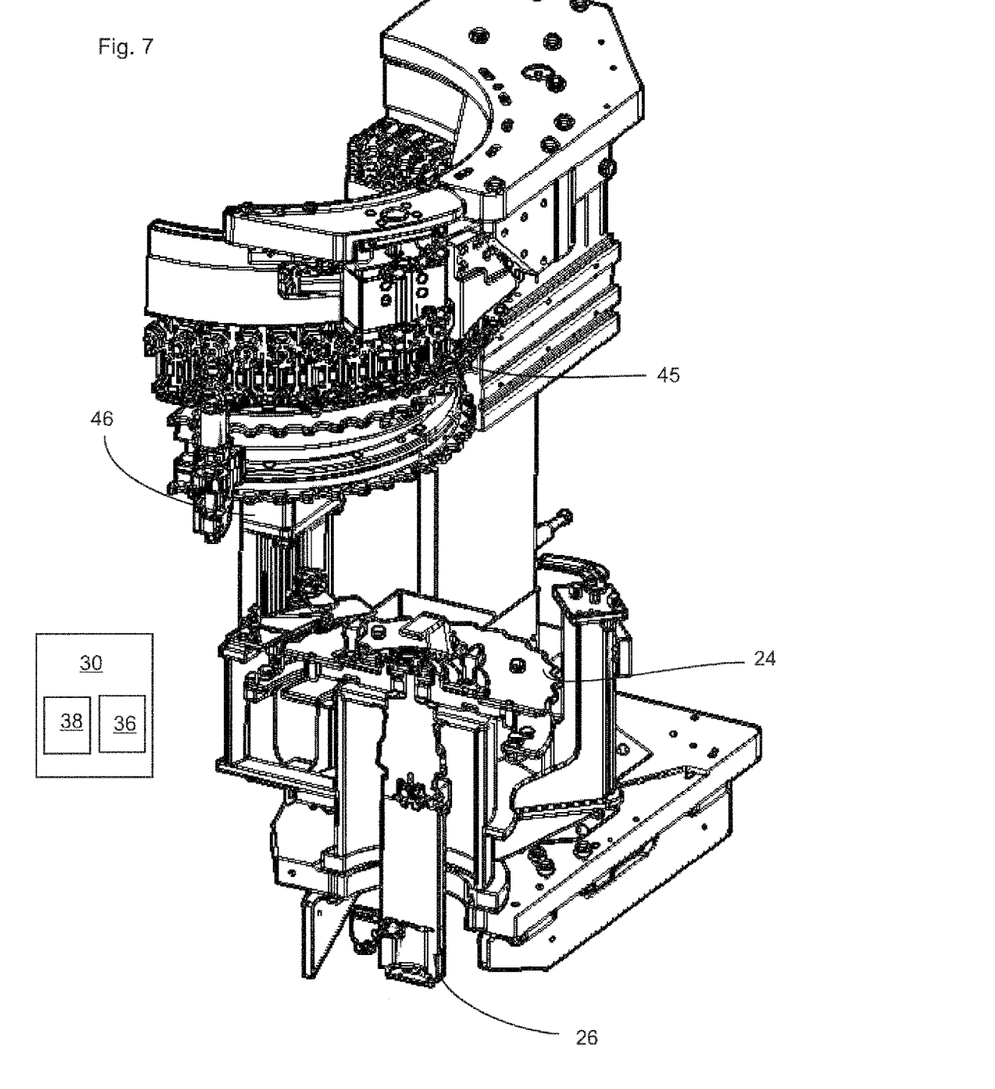
FIG. 7 shows a further detailed view of an apparatus for heating plastic preforms.

FIG. 7 shows a further view of an apparatus according to the invention. Here, too, a first drive device 26 is shown that drives the transport star wheel 24 via a drive shaft 27. What is also shown is a second drive device 46 that drives the diversion wheel 52. Reference sign 30 schematically identifies a control device that controls the two drive devices 26 and 46. In this way, the transfer point U as shown in FIG. 6 can intentionally, albeit merely slightly, be displaced. Reference sign 36 identifies a processor device that calculates, on the basis of the data and in particular of the diameters of different preforms, a correction of an offset between the two transport devices 2, 4. Moreover, input means 38 may be provided, via which the user can input data, for example data in relation to the plastic preform 10 to be processed.

The applicant reserves the right to claim all of the features disclosed in the application documents as being essential to the invention, in as far as they are novel over the prior art either individually or in combination. It is further pointed out that the individual figures also describe features which, by themselves, may be advantageous. A person skilled in the art will immediately realise that a certain feature described in a figure may be advantageous even if no further features from this figure are adopted. A person skilled in the art will further realise that advantages may also result from a combination of a plurality of features shown in individual or in different figures.

LIST OF REFERENCE NUMERALS

L1 Cross section
P Transport path
L Longitudinal direction of the plastic preforms
1 Apparatus
2 First transport device
4 Second transport device
6 Heating devices/heating boxes
10 Plastic preforms
10a Mouth section/plastic preform
10b Base body of the plastic preform
10c Carrier ring
12 Feeding device
16 Control device
18 Sensor device
22 Reception means/recesses
24 Sawtooth star wheel/transport star wheel
25 Guiding rail
26 Drive device
27 Drive shaft
29 Cooling device
30 Control device
32 Gripping element
34 Fastening means
36 Processor device
38 Input means
42 Holding elements/holding mandrels
46 Drive device
50 Drive device
52 Diversion wheel/guiding cam
54 Drive shaft
86 Guiding cam
82 Actuating device
84 Holder
112 Bottom table top
112 Drive device (prior art)

The invention claimed is:

1. An apparatus for heating plastic preforms, comprising a first transport device that transports the plastic preforms in a separated manner, wherein said first transport device has a plurality of recesses for receiving the plastic preforms, comprising a second transport device that is adapted to take over the plastic preforms transported by the first transport device and to transport said plastic preforms along a predetermined transport path, wherein the second transport device has a plurality of holding elements for holding the plastic preforms, and comprising at least one heating device that heats the plastic preforms transported by the second transport device, wherein at least the first transport device is a circulating transport device, wherein a relative position of the recesses of the first transport device in the circulation direction of the first transport device relative to a position of the holding elements in respect of the transport path can be changed, and wherein the first transport device has a first drive device for driving the first transport device and the second transport device has a second drive device for driving the second transport device, wherein the apparatus comprises a further drive device for moving the holding elements in a longitudinal direction of the plastic preforms, and wherein an offset correction between the first drive device and the second drive device is carried out, in which an operator of the machine him/herself establishes correction parameters, wherein the correction parameter for another plastic preform could be input via an input means, so that the apparatus automatically adjust the offset between the first drive device and the second drive device, or the operator selects a respective recipe deposited in the machine, wherein in this recipe already correction parameters as well as further parameters such as respective preform neck parameters are deposited, wherein between a machine control and a servo control of the drive devices a processor device is arranged which determines a difference angle from the previous preforms and the new preform sizes, from which the machine can adjust itself to the new format in relation to the oven infeed.

2. The apparatus as claimed in claim 1, wherein the first drive device and the second drive device are adapted to be controlled independently of each other.

3. The apparatus as claimed in claim 1, wherein the apparatus comprises a feeding device for feeding the plastic preforms to the first transport device, and the first transport device separates these plastic preforms from each other.

4. The apparatus as claimed in claim 1, wherein the apparatus comprises a control device for controlling the two drive devices.

5. The apparatus as claimed in claim 4, wherein said control device is adapted to control at least one of the two drive devices also on the basis of a parameter that is characteristic of a geometry of the plastic preforms.

6. The apparatus as claimed in claim 1, wherein the apparatus comprises a processor device that determines an offset between the two drive devices from at least one characteristic variable of a plastic preform.

7. The apparatus as claimed in claim 1, wherein the apparatus comprises a control device that is adapted to control an offset between the two drive devices.

8. The apparatus as claimed in claim 1, wherein a relative position of the recesses of the first transport device in the circulation direction of the first transport device relative to a position of the holding elements in respect of the transport path can be changed in order to change in this way a take-over position, at which the second transport device takes over the plastic preforms.

9. The apparatus as claimed in claim 1, wherein the first transport device comprises a rotatable carrier and the recesses are formed as recesses on an outer circumference of said carrier.

10. A method for heating plastic preforms, wherein the plastic preforms are transported in recesses of a first transport device and are taken over by a second transport device in a predetermined take-over position and are transported by said second transport device by holding elements that hold the plastic preforms along a predetermined transport path, and are heated, at least temporarily, during the transport along the transport path by at least one heating device, wherein a relative position of the recesses of the first transport device in the circulation direction of the first transport device relative to a position of the holding elements in respect of the transport path can be changed, wherein a further drive device for moving the holding elements in a longitudinal direction is provided, and wherein an offset correction between the first drive device and the second drive device is carried out, in which an operator of the machine him/herself establishes correction parameters, wherein the correction parameter for another plastic preform could be input via an input means, so that the apparatus automatically adjust the offset between the first drive device and the second drive device, or the operator selects a respective receipt deposited in the machine, wherein in this recipe already correction parameters as well as further parameters such as respective preform neck parameter are deposited, wherein between a machine control and a servo control of the drive devices a processor device is arranged which determines a difference angle from the previous preforms and the new preform sizes, from which the machine can adjust itself to the new format in relation to the oven infeed.

11. The apparatus as claimed in claim 1, wherein the second transport device is disposed downstream of the first transport device.

12. The apparatus as claimed in claim 1, wherein the second transport device follows directly from the first transport device and is adapted to take over the plastic preforms immediately from the first transport device.

13. The apparatus as claimed in claim 1, wherein a pitch of the recesses of the first transport device corresponds to a pitch of the holding devices of the second transport device.

14. The apparatus as claimed in claim 1, wherein the holding elements of the second transport device are mandrels that are adapted to be introduced into the mouths of the plastic preforms.

15. The apparatus as claimed in claim 1, wherein the first transport device and the second transport device are decoupled from each other with regard to their transport movements and/or are adapted to be decoupled at least at times.

16. The apparatus as claimed in claim 1, wherein the drive device is adapted for moving the holding elements in a longitudinal direction of the plastic preforms and is adapted to be deactivated during an on-going operation.

17. The apparatus as claimed in claim 14, wherein the apparatus includes a controllable lifting cam which is adapted for feeding the holding mandrels into the mouths of the plastic preforms.

* * * * *